(12) United States Patent
O'Brien et al.

(10) Patent No.: US 8,377,845 B2
(45) Date of Patent: Feb. 19, 2013

(54) COMPOSITE FILM

(75) Inventors: Jeffrey James O'Brien, Walworth, NY (US); Robert M. Sheppard, Victor, NY (US); Pang-Chia Lu, Pittsford, NY (US)

(73) Assignee: Exxonmobil Oil Corporation, Irving, TX (US)

( * ) Notice: Subject to any disclaimer, the term of this patent is extended or adjusted under 35 U.S.C. 154(b) by 1044 days.

(21) Appl. No.: 11/482,600

(22) Filed: Jul. 7, 2006

(65) Prior Publication Data
US 2008/0009413 A1    Jan. 10, 2008

(51) Int. Cl.
*B41M 5/50* (2006.01)
(52) U.S. Cl. .................. 503/227; 428/212; 428/304.4
(58) Field of Classification Search .................. None
See application file for complete search history.

(56) References Cited

U.S. PATENT DOCUMENTS

| | | |
|---|---|---|
| 4,621,271 A | 11/1986 | Brownstein |
| 5,244,861 A | 9/1993 | Campbell et al. |
| 5,350,732 A | 9/1994 | Kosydar et al. |
| 5,350,733 A | 9/1994 | Campbell et al. |
| 5,387,574 A | 2/1995 | Campbell et al. |
| 5,451,561 A | 9/1995 | Campbell et al. |
| 5,604,078 A | 2/1997 | Campbell et al. |
| 5,612,283 A | 3/1997 | Campbell et al. |
| 5,665,670 A | 9/1997 | Burberry et al. |
| 5,677,262 A | 10/1997 | Mruk et al. |
| 5,747,415 A | 5/1998 | Campbell et al. |
| 5,858,919 A | 1/1999 | Campbell et al. |
| 6,274,284 B1 * | 8/2001 | Aylward et al. .................. 430/97 |
| 6,436,604 B1 | 8/2002 | Bourdelais et al. |
| 6,740,465 B2 * | 5/2004 | Liang et al. .................. 430/138 |
| 2003/0129373 A1 | 7/2003 | Migliorini et al. |

FOREIGN PATENT DOCUMENTS

| | | |
|---|---|---|
| EP | 0 613 773 | 9/1994 |
| EP | 1 115 027 | 7/2001 |
| EP | 1 142 701 | 10/2001 |
| EP | 1 286 211 | 2/2003 |
| GB | 2 083 726 | 3/1982 |
| WO | WO 94/04961 | 3/1994 |
| WO | WO 00/12305 | 3/2000 |
| WO | WO 01/26896 | 4/2001 |
| WO | WO 2004/060671 | 7/2004 |

* cited by examiner

*Primary Examiner* — Bruce H Hess
(74) *Attorney, Agent, or Firm* — Kevin M. Faulkner; Rick F. James

(57) ABSTRACT

A composite film useful for image supporting media, including: a first layer containing a thermoplastic polymer and optionally containing a whitening agent; a second layer containing a thermoplastic polymer and a whitening agent; a third layer containing a thermoplastic polymer and a cavitating agent, wherein the third layer is a cavitated layer; optionally a fourth layer containing a thermoplastic polymer and optionally a whitening agent; and optionally a fifth layer containing a thermoplastic polymer and optionally a whitening agent; wherein the second layer is between the first layer and the third layer, the third layer is between the second layer and the optional fourth layer, and the optional fourth layer is between the third layer and the optional fifth layer. Embodiments may have the advantage(s) of improved outer surface characteristics, compressibility, thermal insulation, whiteness, and/or stiffness.

35 Claims, 2 Drawing Sheets

COMPOSITE FILM

FIELD OF THE INVENTION

This invention relates to composite films, including composite films that may be useful in preparing image-supporting media, including dye diffusion thermal transfer printing.

BACKGROUND OF THE INVENTION

Due to their low cost and appealing appearance, composite films are commonly used and referred to in the trade as "packaging films" and/or "labeling films." For example, in the packaging of certain types of foods, a composite film may be used having three or more layers, wherein one or both of the outer layers serves primarily as a heat seal layer, while the other layers may provide other desirable properties, such as structural integrity, barrier, appearance, slip, sealability, printability, and/or other functions.

Composite films are also used in a wide variety of graphical, print media, and industrial applications. Composite films are commonly prepared using polymeric components, such as polypropylene, polyethylene, and other polymer compositions. Coatings, additives, and/or surface treatments may be included to enhance the performance of the polymer films or to overcome some of the limitations of such films. For example, polymeric films may be difficult to print with waterbase inks, so a film surface may be coated with a printable coating, treated to increase the surface energy, or provided with an additive in the skin layer to render the surface more printable.

As polymeric films are commonly formed from thermoplastic polymers, such films have limitations with respect to their tolerance of heat and heat related treatments and applications. Too much heat may cause shrinkage, distortion, and sticking to processing equipment. Similarly, such films tend to be rather poor insulators against heat migration.

Polymeric films also are commonly relatively transparent or clear unless rendered opaque or translucent, such as by fillers, cavitation, metallization, and/or coloring agents, such as whitening agents. One drawback to such components is that they may adversely alter the aesthetic properties of a film, such as to cause the films to exhibit a matte surface, reduced gloss, or reduced light transmissibility. A glossy, white background behind printing or images may desirably contribute to a higher quality print result as compared to a film having reduced whiteness. Increases in the loading of fillers or coloring agents may also contribute to mechanical performance problems, such as increased dusting, abrasion, or filler build-up on the processing equipment or on the film surface. A skin layer may be applied over the filler-containing layer, but one drawback to such skin layers is possible loss of whiteness and light transmission due to such skin layer.

U.S. Pat. No. 5,244,861, entitled "Receiving Element for use in Thermal Dye Transfer," provides an example of the prior art. The '861 patent discloses a thermal dye transfer receiving element comprising a base having thereon a dye image-receiving layer, the base comprising a composite film laminated to a support, the dye image-receiving layer being on the composite film side of the base. The composite film comprises a cavitated, thermoplastic core layer, and at least one substantially void-free thermoplastic surface layer.

It is desired to produce a polymeric film that is useful for thermal dye transfer printing, having improved compressibility, insulating properties, gloss, and whiteness, without the adverse effects of merely increasing the loading of whitener in a film layer. The film should also facilitate improved printing and processing speed and insulating properties. Improved image quality and processing speed may facilitate lower cost and allow dye diffusion thermal transfer printing to compete with other printing technologies, such as ink jet.

SUMMARY OF THE INVENTION

In a first aspect, the invention described herein features a composite film and more particularly a composite film that may provide improved functionality and aesthetic appearance in thermal dye transfer. The composite film may include a first or skin layer containing a thermoplastic polymer. The composite film may also include a second layer containing a thermoplastic polymer and a whitening agent. Optionally, the first layer may also contain a whitening agent. When the first layer contains a whitening agent, the amount of whitening agent within the first layer is significantly less than the amount of whitening agent in the second or tie layers. The composite film may additionally include a third layer containing a thermoplastic polymer and a cavitating agent. Thereby, the vast majority of the whitening agent is captured between polymeric layers in the second or tie layer. The third layer may preferably be a cavitated layer. Cavitating a film may increase its thermal insulation qualities as compared to an analogous non-cavitated film due to the entrapped gas or air within the voids.

In still other embodiments, the composite film may further include a fourth layer containing a thermoplastic polymer. The composite film may still further include a fifth layer containing a thermoplastic polymer. The second layer may be between the first layer and the third layer. When the fourth layer is present, the third layer may be between the second layer and the fourth layer. The fourth layer may be between the third layer and the fifth layer and may also include some whitening agent in the fourth layer.

In another aspect, the invention also features a dye-receiving element that comprises a dye-image receiving layer in combination with the composite film structure, and optionally also a support. The dye-receiving element may include a base having thereon the dye image-receiving layer. The base may include the composite film from the first aspect and the support. The dye image-receiving layer may be on the composite film side of the base.

In yet another aspect, the invention features a process of forming a dye transfer image. The process may include imagewise-heating a dye-donor element including a donor support element having thereon a dye layer that includes a dye dispersed in a binder. The process may also include transferring a dye image to a dye-receiving element to form the dye transfer image. The dye-receiving element may include a base having thereon a dye image-receiving layer. The base may include the composite film from the first aspect and a support. The dye image-receiving layer may be on the composite film side of the base.

In a fourth aspect, the invention features a thermal dye transfer assemblage. The assemblage may include a dye-donor element including a donor support having thereon a dye layer containing a dye dispersed in a binder. The assemblage may also include a dye-receiving element including a base having thereon a dye image-receiving layer. The dye-receiving element may be in a superposed relationship with the dye-donor element, so that the dye layer may be in contact with, adjacent, and/or facing the dye image-receiving layer. The dye-receiving element base may include the composite film from the first aspect and a support. The dye image-receiving layer may be on the composite film side of the dye-receiving element base. One or more of the following features may also be included.

The first layer of the composite film may optionally further contain a whitening agent. The amount of the whitening agent in the second layer of the composite film is greater than the amount of the whitening agent in the first layer. The amount by weight percent of the whitening agent in the second layer is preferably more than 10 times greater than the amount of the whitening agent by weight percent in the first layer. The second layer may contain up to 60 wt % of the whitening agent, based on the total weight of the second layer.

The optional fourth layer of the composite film may further contain a whitening agent. The optional fifth layer of the composite film may optionally further contain a whitening agent. The amount of the whitening agent in the fourth layer may be greater than the amount of the whitening agent in the fifth layer, when both layers are present. The amount of the whitening agent in the fourth layer may be more than 10 times greater than the amount of the whitening agent in the fifth layer. The fourth layer may preferably contain up to 35 wt % of a whitening agent, based on the total weight of the fourth layer, regardless of whether the fifth layer is present. The amount of the whitening agent in the second layer may be greater than the amount of the whitening agent in the fourth layer, when present. In some preferred embodiments, at least one of the first layer and the fifth layer may be free of any whitening agent, or each of the first layer and the fifth layer may be free of any whitening agent.

The third layer of the composite film may have a density of from 0.35 to 0.55 $g/cm^3$, and the third layer may contain an amount of the cavitating agent sufficient to provide such a density. The third layer may have a void percentage of from 40 to 60%, and the third layer may contain an amount of the cavitating agent sufficient to provide such a void percentage. An outer surface of the first layer may have a 45-degree gloss of from 5 to 70%, as measured according to ASTM D 2457. At least one of the second layer and the optional fourth layer may have a thickness of from 1.25 to 7.75 µm, or each of the second layer and the optional fourth layer may independently have a thickness of from 1.25 to 7.75 µm.

The thermoplastic polymer of the third layer may contain a polypropylene. The whitening agent of the second layer may contain titanium dioxide. The cavitating agent of the third layer may contain a cavitating agent, such as polybutylene terephthalate or calcium carbonate.

The support of the base of the dye-receiving element may contain cellulose fiber paper. The base including the composite film and the support may be a laminate having the composite film laminated onto the support. The laminate may be an extrusion-laminate containing a pigmented polyolefin for extrusion-laminating the composite film onto the support. The dye image-receiving layer of the dye-receiving element may contain a polycarbonate.

The dye-receiving element may further include a primer layer for the dye image-receiving layer between the composite film and the dye image-receiving layer. The dye-receiving element may further include an overcoat on a side of the dye image-receiving layer opposite the composite film.

The dye-receiving element may further include a film, such as a polymer film, on a side of the support opposite the composite film. The film may be laminated onto the side of the support opposite the composite film. The film may be extrusion-laminated with a high density polyethylene onto the side of the support opposite the composite film. Thus, for example, the dye-receiving element may further include a high density polyethylene film, another film, and/or a primer layer on a side of the support opposite the composite film. As another example, the dye-receiving element may further include a high density polyethylene, a film, a primer layer, and an antistatic layer on a side of the support opposite the composite film. The film on the side of the support opposite the composite film may be a multilayer film. Embodiments of the invention may have one or more of the following advantages.

The composite films may have desirable outer surface characteristics, compressibility, thermal insulation, whiteness, and/or stiffness. For example, an outer surface(s) of the composite film may be desirably smooth and/or may have a low amount of dust, a low number of defects, and/or high gloss. As another example, the composite films may have stiffness sufficient to provide a low tendency to curl and a high crease-resistance, even under adverse environmental conditions.

In embodiments useful, for example, as dye-receiving elements or thermal dye transfer assemblages, the outer surface characteristics of the composite films may result in excellent image quality. In these embodiments, the compressibility and thermal insulation properties of the composite films may advantageously affect how much dye is transferred to a receiver sheet from a donor ribbon as the two materials come together between a thermal print head and a transfer drum. For example, the compressibility of the composite films may result in desirably intimate contact with the donor ribbon, and the thermal insulation of the composite films may permit printing to be conducted at a desirably high speed.

Further aspects, features, and advantages will become apparent from the following.

DETAILED DESCRIPTION OF THE INVENTION

Figure 1:
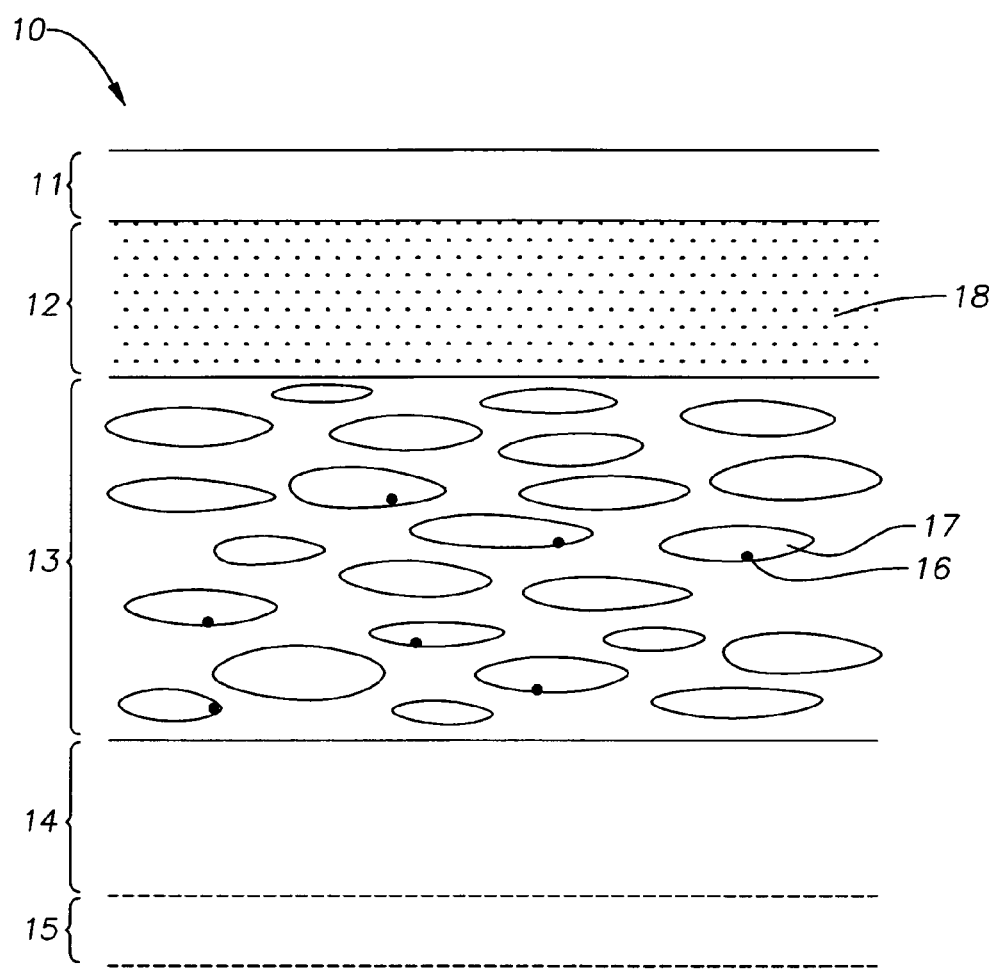
FIG. 1 provides a cross-sectional illustration of an embodiment of a composite film according to the present invention.

The specific lower or upper limit of any range described herein is not intended to be an absolute value. Instead, a lower or upper limit of a range may include within its scope a reasonable extension of the range value as dictated by the conditions. For example, variations of up to several percent of the value of each endpoint are also encompassed to ensure that the range includes any experimental error that may occur in a measurement.

The composite films of this invention may be particularly useful as image-supporting films. More particularly, the composite films may be useful to enhance the aesthetic appearance and/or other qualities of image supporting media, including but not limited to dye-transfer images, such as thermal dye transfer images. Some embodiments of the composite films according to this invention may include only first, second and third layers. Other preferred embodiments may include first, second, third, fourth and fifth layers. In other embodiments, the fourth and/or fifth layers may be excluded. The second layer may be between the first layer and the third layer. The third layer may be between the second layer and the fourth layer, when the fourth layer is present. The fourth layer may be between the third layer and the fifth layer, when the fifth layer is present. Some embodiments may include the fifth layer, but not include the fourth layer. In some preferred composite films, the first and fifth layers may be skin layers, the second and fourth layers may be tie layers, and the third layer may be a core layer. The composite films may include additional layers besides the first, second, third, fourth and fifth layers.

Each of the layers of the composite films may contain a thermoplastic polymer. Preferred classes of thermoplastic polymers from which one or more components for the layers may be independently chosen include polyolefins, polyesters, polyamides, polycarbonates, cellulosic esters, polystyrene, polyvinyl resins, polysulfonamides, polyethers, polyimides, poly(vinylidene fluoride), polyurethanes, poly(phenylene sulfides), polytetrafluoroethylene, polyacetals, polysulfonates, polyester ionomers, and polyolefin ionomers. Other examples of thermoplastic polymers may include copolymers and/or mixtures of any of the above. Preferred polyolefins for the layers may include polypropylene, polyethylene, polymethylpentene, and mixtures thereof. Other examples may include polyolefin copolymers, such as copolymers of ethylene and propylene and terpolymers of ethylene, propylene, and butylene.

In preferred composite films, one or both of the first and fifth layers may contain an ethylene-propylene-butylene (EPB) terpolymer or an ethylene-propylene (EP) copolymer. In other preferred composite films, the third layer may contain a polypropylene, such as, for example, a propylene homopolymer. In still other preferred composite films, each of the second, third, and fourth layers may contain a polypropylene. Examples of commercially available thermoplastic polymers include: PP4612 and PP4712, which are polypropylenes available from ExxonMobil Chemical (Houston, Tex.); EOD 04-28, which is a polypropylene available from Total; and XPM7510, which is an ethylene-propylene-butylene terpolymer available from Japan Polypropylene Corporation (JPC), Minato-Ku, Tokyo.

Certain layers of the composite films may contain a whitening agent(s) and may preferably contain such whitening agent in various relative concentrations as further discussed below. Preferred examples of the whitening agent may include titanium dioxide, barium sulfate, clay, calcium carbonate, zinc sulfide, magnesium carbonate, talc, and kaolin. Preferred examples of the whitening agent may be commercially available as a masterbatch, such as an ethylene-propylene copolymer/titanium dioxide masterbatch, such as may be available from Ampacet. The second or tie layer(s) of the inventive films may contain up to 60 wt % of a whitening agent, based upon the total weight of the second layer(s). For example, a tie layer may comprise an ethylene-propylene copolymer/titanium dioxide tie layer comprising 60 wt % of $TiO_2$ and in another embodiment a polypropylene/titanium dioxide tie layer may contain up to 50 wt % $TiO_2$. Titanium dioxide may be a particularly preferred whitening agent. The titanium dioxide may be either anatase- or rutile-type. The anatase and rutile titanium dioxide may be blended to improve both whiteness and sharpness.

In some preferred composite films, the amount of the whitening agent in the second layer is greater than the amount of the whitening agent in the first layer. For example, the amount of the whitening agent in the second layer may be more than about 10 times greater, preferably more than about 15 times greater, and most preferably more than about 25 times greater, than the amount of the whitening agent in the first layer. In certain preferred composite films, the second layer may contain from 15 wt % to 60 wt % of a whitening agent, preferably from 20 to 60 wt %, and in some preferred embodiments, from 20 to 35 wt %, based on the total weight of the second layer. In other preferred composite films, the second layer may contain at least 20 wt % of a whitening agent and preferably at least 25 wt % whitening agent. Some embodiments may contain at least 30 wt % whitening agent in the second or the layer(s), while others may contain at least about 40 wt % whitening agent, while still other embodiments may contain up to about 60 wt % of whitening agent.

In other preferred composite films, the amount of the whitening agent in the fourth layer may be greater than the amount of the whitening agent in the fifth layer, when both layers are present. For example, the amount of the whitening agent in the fourth layer may be more than 10 times greater, preferably more than 15 times greater, and most preferably more than 25 times greater, than the amount of the whitening agent in the fifth layer. In certain preferred composite films, the fourth layer may contain up to 35 wt % of a whitening agent, preferably up to 15 wt %, more preferably from 2 to 15 wt % whitening agent, based on the total weight of the fourth layer. In some preferred composite films, the amount of the whitening agent in the second layer is greater than the amount of the whitening agent in the fourth layer.

In some preferred composite films, at least one of the first layer and the fifth layer, when present, may be free of whitening agent, or each of the first layer and the fifth layer may be free of any whitening agent. A layer of a composite film which is "free" of any whitening agent encompasses layers which are absolutely free of any whitening agent and layers which are substantially free of whitening agent, such as, for example, layers which may contain one or more whitening agents as impurities or which may intermingle from adjacent layers. A layer may generally be considered free of whitening agent if it contains less than about 0.01 wt % of whitening agent, based upon the total weight of such layer. The second layer preferably comprises at least about 15 wt % of whitening agent, the fourth layer, when present, may comprise at least about 2 wt % whitening agent. In other embodiments the second layer may preferably contain at least 20 wt % whitening agent and more preferably contain at least 30 wt % whitening agent, regardless of whether or not the first layer contains whitening agent. The fourth layer, when present, may contain at least 2 wt % whitening agent, more preferably at least 6 wt %, and still more preferably at least 10 wt % whitening agent.

When the first layer includes a whitening agent, the first layer may comprise from about 0.02 wt % to about 0.20 wt % of whitening agent, based upon the total weight of the first layer. The second layer includes at least 15 wt % of whitening agent, based upon the total weight of the second layer. In some embodiments, the second layer may include at least 10 times the amount of whitening agent as in the first layer, based upon the total weight of the second layer. In other embodiments, the second layer may comprise at least about 25 wt % whitening agent, or at least about 30 wt % whitening agent, at least about 40 wt % whitening agent, or even up to 60 wt % whitening agent, based upon the total weight of the second layer. For those embodiments having whitening agent within the first layer, the whitening agent may comprise from about 0.02 wt % up to about 0.20 wt % of the total weight of the first layer, while other embodiments may contain only up to about 0.10 wt % whitening agent.

By reducing or eliminating the amount of whitening agent in the first and fifth layers of the composite films, while including a whitening agent in the second and/or fourth layers thereof, the outer surface characteristics of the composite films may be advantageously affected. For example, outer surfaces of the composite films may produce less dust, have fewer defects, and be smoother than a comparable film having a higher percentage, or all, of the whitening agent in the outer layers thereof, e.g., in the first and/or fifth layers thereof. Also, by reducing or eliminating the amount of whitening agent in the first and fifth layers of the composite films, while including a whitening agent in the second and/or fourth layers thereof, composite films having a high gloss surface may be provided. Alternatively, other outer skin layers may be provided on the outer surface of the first and/or fifth layers, such that the first and/or fifth layers may be provided with a whitening agent. Thereby, desired aesthetic and visual properties of the film, such as may be desirable in an image-supporting film component, may be accomplished by providing a stepwise increase in whitening agent between adjacent layers, without incurring the detrimental effects of having whitening agent in an outer skin layer.

Each of the layers of the composite films may contain a cavitating agent. Preferred cavitating agents may include organic and inorganic cavitating agents. Particularly preferred examples of inorganic cavitating agents may include calcium carbonate ($CaCO_3$), barium carbonate ($BaCO_3$), clay, talc, silica, mica, and mixtures thereof. Particularly preferred examples of organic cavitating agents may include nylon, polyester, such as a polyethylene terephthalate (PET) or a polybutylene terephthalate (PBT). Organic cavitating agents may be particularly preferred. The most preferred cavitating agent may be PBT. Examples of commercially available PBT include 1300 A, available from Celanese, and Valox 295, available from G.E.

Also, layers of the composite films containing a polypropylene may contain a beta-nucleating agent as a cavitating agent. For example, a composite film may include a third layer containing BEPOL 022SP, which is a masterbatch of isotactic propylene homopolymer and beta-nucleating agent, available from Sunoco Chemicals. Layers of the composite films containing a beta-nucleating agent as a cavitating agent may contain the beta-nucleating agent as the only cavitating agent, or they may contain a beta-nucleating agent and one or more additional cavitating agents.

The amount of cavitating agent to be included in a layer of the composite film is not particularly limited and may correspond to the desired degree of void formation upon stretching. Preferred composite films may contain a cavitating agent in the third layer. Particularly preferred composite films may contain PBT as a cavitating agent in the third layer. The most preferred composite films may contain from 2 to 15 wt % of PBT as a cavitating agent in the third layer, based on the total weight of the third layer.

In preferred composite films according to this invention, at least one of the first, second, fourth, and fifth layers are substantially non-cavitated. By having at least one of the first, second, fourth and fifth layers non-cavitated, the composite film may have a improved tensile strength and it may be more easily manufacturable, as compared to an all-layer-cavitated composite film. By having at least one of the first, second, fourth and fifth layers be non-cavitated, it may be possible to provide film composites having wide widths and high draw ratios, especially in comparison to film composites made with all layers cavitated.

To modify or enhance certain properties of the composite film, one or more of the layers may contain dispersed therein, appropriate additives, in effective amounts as determined by the desired use or application for the composite film. Preferred additives may include anti-blocks, anti-static agents, anti-oxidants, anti-condensing agents, co-efficient of friction (COF) modifiers (slip agents), processing aids, colorants, clarifiers, foaming agents, flame retardants, photodegradable agents, UV stabilizers or UV blocking agents, crosslinking agents, and ionomers. Other examples of additives may include optical brighteners or fluorescing agents which absorb energy in the ultraviolet (UV) region and emit light largely in the blue region. For example, preferred composite films may include a first and/or second layer containing an optical brightener.

Composite films having a high stiffness may be provided by including within one or more layers of the composite film a high modulus resin and/or filler, such as, for example, a highly crystalline polypropylene, polyester, or high density polyethylene (HDPE). Preferred composite films having high stiffness may contain a high modulus resin and/or filler in one or more of the first through fifth layers, especially the first and fifth layers. The high modulus resin can be included as part of a blend with other components of a particular layer. Composite films having a higher stiffness may exhibit a reduced tendency to curl and an improved crease-resistance, even under adverse environmental conditions, as compared to less stiff films.

Methods of manufacturing the composite films are not particularly limited. For example, melts corresponding to the individual layers of the composite film may be prepared. The melts may be cast-extruded or coextruded into a sheet using a flat die or blown-extruded or coextruded using a tubular die. The sheets may then be oriented either uniaxially or biaxially by known stretching techniques. For example, the sheet may be uniaxially oriented from four to eight times of orientation ratio. After a film has been stretched, it may be heat-set by heating the film to a temperature sufficient to melt and then crystallize the polymers, while restraining, to some degree, the film against retraction in both directions of stretching. While the composite films may be made by any method, preferably the composite films are made by coextrusion and biaxial orientation of the layers. The biaxial orientation may be accomplished by either sequential or simultaneous orientation. Particularly preferred composite films may be oriented from four to six times in the machine direction and from four to ten times in the transverse direction.

One or both outer surfaces of the composite films may be surface-treated, for example, after the coextrusion and orienting processes or between casting and orientation. Surface treatment of one or both outer surfaces may improve any of a number of properties of the composite films, including printability, barrier, heat-sealability, or adhesion properties. The surface-treatment may be affected by any of various techniques, including, for example, flame treatment, corona treatment, and plasma treatment. Preferred composite films may be corona-treated on an outer surface thereof. Particularly preferred composite films may be corona-treated on an outer surface of the composite film, opposite the outer surface of the first layer, such as on the outer surface of the third, fourth or fifth layer.

One or both outer surfaces of the composite films may be coated with a coating, for example, after the coextrusion and orienting processes or between casting and full orientation. A coating on one or both outer surfaces may improve any of a number of properties of the composite films, including printability, barrier, heat-sealability, or adhesion properties, or may enhance compatibility with manufacturing processes and machinery. Suitable coatings for an outer surface of a composite film may include, for example, primer coating, polyvinylidene chloride (PVdC), acrylic, silicon oxide ($SiO_x$) coating, or a water-based coating.

Total thickness of the composite films is not particularly limited. Certain composite films may have an overall optical gauge thickness of greater than 30 µm, wherein optical gauge may be measured with, for example, a mechanical micrometer or a laser beam. Other composite films may have an overall thickness of from 20 µm to 100 µm optical gauge, preferably 30 µm to 50 µm, more preferably from 35 µm to 40 µm for optical gauge.

In preferred composite films, the optical gauge thickness of each layer may be less than 2 µm for each of the first and fifth layers (independently); for example, from 0.5 µm to 1.5 µm, more preferably from 0.75 µm to 1.0 µm, for the first layer; from 0.5 µm to 1.5 µm, more preferably from 0.75 µm to 1.0 µm, for the fifth layer; and from 1.25 to 7.75 µm, more preferably from 2.5 µm to 3.8 µm, for the second and fourth layers, independently. The remainder of the composite film thickness in preferred cases up to the overall thickness may be made up of the third layer.

Gloss is a measurement of the relative luster of a film surface. 45-degree gloss is determined from an incident light beam that strikes a film surface at a 45-degree angle from the perpendicular. A sensor may be used to measure the amount of light reflected by the film surface at a mirror image angle. The gloss value is the ratio of reflected light to incident light and may be reported in gloss units. Using any commercially available glossmeter to measure 45-degree gloss consistent with ASTM procedure D 2457, an outer surface of the first layer of preferred composite films may have a 45-degree gloss of from 5 to 70 gloss units, or 25 to 60 gloss units.

Preferred composite films may have an overall density of from 0.3 to 0.7 $g/cm^3$, preferably from 0.4 to 0.65 $g/cm^3$, more preferably from 0.5 to 0.6 $g/cm^3$. The density of the composite film may be measured by a method of first measuring the yield of the film. Specifically, 80 pieces of film from a film sample are cut, each having a diameter of 4 inches (10.16 cm). The total area of the 80 pieces is then calculated. The weight of the 80 pieces (in grams) is then measured. The yield of the film ($cm^2$/gram) will equal the total specimen area ($cm^2$) over the specimen weight (gram). After measuring the film yield, the film thickness may be measured with a laser beam. For example, the film thickness (mil) may be measured with a Model 238-20, available from Beta LaserMike Company. The thickness unit value may be converted from mils to centimeters. This non-contact method for measuring film thickness may be especially suitable for a film composite containing a voided layer(s) because it may avoid the error that sometimes arises from mechanical compression on the film as may be caused by a conventional micrometer. The density (gram/$cm^3$) may then be calculated from the inverse (1/X) of the product of the film yield ($cm^2$/gram) times the film thickness (cm).

Preferred composite films may include a core layer, e.g., the third layer, having a low density, such as, for example, from 0.35 to 0.55 $g/cm^3$, more preferably from 0.40 to 0.50 $g/cm^3$. Preferred core layers may contain an amount of a cavitating agent sufficient to provide such a density. Composite films including a core layer having a low density may also be provided by increasing the thickness of layers adjacent to the core layer, e.g., the second and fourth layers, while maintaining the same overall yield and optical gauge.

Other preferred composite films may include a core layer, e.g., the third layer, having a void percentage of from 40 to 60%, more preferably from 45 to 55%. Preferred core layers may contain an amount of a cavitating agent sufficient to provide such a void percentage.

A composite film having a core layer having a low density or a high void percentage may advantageously exhibit more compressibility, better thermal insulation, and better whiteness in comparison to a comparable film having a core layer having a higher density or a lower void percentage. Accordingly, a composite film having a core layer having a low density or a high void percentage may be well-suited for, for example, providing thermal transfer print media.

Graphic media systems, such as dye diffusion thermal transfer printing systems, may obtain prints, color or black-and-white, from pictures that have been taken or generated electronically from a color video camera, such as a digital camera, or from any other electronic graphic file, text, or coding. According to one way of obtaining such prints, an electronic picture may be subjected to color separation by color filters. The respective color-separated images may then be converted into electrical signals. These signals may then be processed or operated on to produce a representative combination of cyan, magenta, and yellow electrical signals. These signals may then be transmitted to a thermal printer. To obtain the print, a cyan, magenta or yellow dye-donor element may be placed face-to-face, substantially in contact with or within close contact with, a dye-receiving element. The two elements may then be inserted between a thermal printing head and a platen roller.

A line-type thermal printing head may be used to apply heat from the back of the dye-donor sheet. The thermal printing head may have many heating elements and may be heated up sequentially in response to the cyan, magenta and yellow signals. The process may then be repeated for the other two colors. A color hard copy may thus be obtained which corresponds to the original picture viewed on a screen. Further details of this process and an apparatus for carrying it out are contained in, for example, U.S. Pat. No. 4,621,271, the disclosure of which is hereby incorporated by reference.

In a thermal dye transfer printing process, it may be desirable for the finished prints to compare favorably with color photographic prints in terms of image quality. A thermal dye receiver base may impact image quality by virtue of several characteristics it may possess. For example, transport through the printer may be affected by base properties, such as, for example, curl and stiffness of the base, both before and after printing. Also, composite films wherein the amount of the whitening agent in the second layer is greater than the amount of the whitening agent in the first layer, and/or the amount of the whitening agent in the optional fourth layer is greater than the amount of the whitening agent in the optional fifth layer, may facilitate improved surface texture, which advantageously affects the look of the final print.

In addition, image uniformity may be affected by the compressibility, or conformability, of the receiver base. The efficiency of thermal transfer of dye from the dye-donor to the receiver may be affected by the base's ability to maintain a high temperature at its surface. Composite films wherein the amount of whitening agent in the second layer is several times greater than the amount of the whitening agent in the first layer, and/or the amount of the whitening agent in the fourth layer is several times greater than the amount of the whitening agent in the fifth layer, may allow for less heat transfer to the core of the composite film, and thus may be able to maintain a high temperature at its surface. As a specific example, the compressibility and thermal insulation properties of the composite films may advantageously affect how much dye is transferred to a dye-receiving layer from a dye-donor element/ribbon as the two materials come together between a thermal print head and a transfer drum. The cavitation may facilitate some compressibility and thermal insulation. The high loading of whitening agent may also contribute some thermal insulation properties to the film. The compressibility of the composite films may result in desirably intimate contact with the donor ribbon and the thermal insulation of the composite films may permit printing to be conducted at a desirable high speed as compared to non-cavitated composite films or films having low amounts of whitening agent within the film.

Referring to the figures, FIG. 1 provides a cross-sectional illustration of an embodiment of a composite film 10 according to the invention. The composite film 10 illustrates a first or skin layer 11, a second or tie layer 12, and a third or core layer 13, each of which contain a thermoplastic polymer. The skin layer 11 may include a whitening agent in some embodiments, but some more preferred embodiments will be substantially free of whitening agent, except for any incidental amount that may bleed over from the tie layer or manufacturing equipment. In embodiments that are substantially free of whitening agent, the amount of whitening agent or titanium present within such layer may typically represent less than about 0.02 wt % of such layer, based upon the total weight of the layer.

The second or tie layer 12 also comprises a thermoplastic polymer and a whitening agent. The tie layer 12 contains at least 20 wt % of a whitening agent 18. Where the first layer also contains a whitening agent, the amount of whitening agent within the second layer 12 may preferably be at least ten times by weight of the second layer as the amount by weight of whitening agent within the first layer 11. The second layer 12 may contain up to 60 wt % of whitening agent, based upon the weight of the second layer 12. The third layer 13 comprises a thermoplastic polymer and a cavitating agent and is cavitated, typically during orientation. FIG. 1 also depicts optional fourth 14 and fifth 15 layers. The optional fourth layer comprises a thermoplastic polymer and optionally a whitening agent. The fifth layer 15 also comprises a thermoplastic polymer and optionally a whitening agent. Many preferred embodiments that comprise the optional fourth 14 and/or fifth 15 layers may not include any whitening agent.

Figure 2:
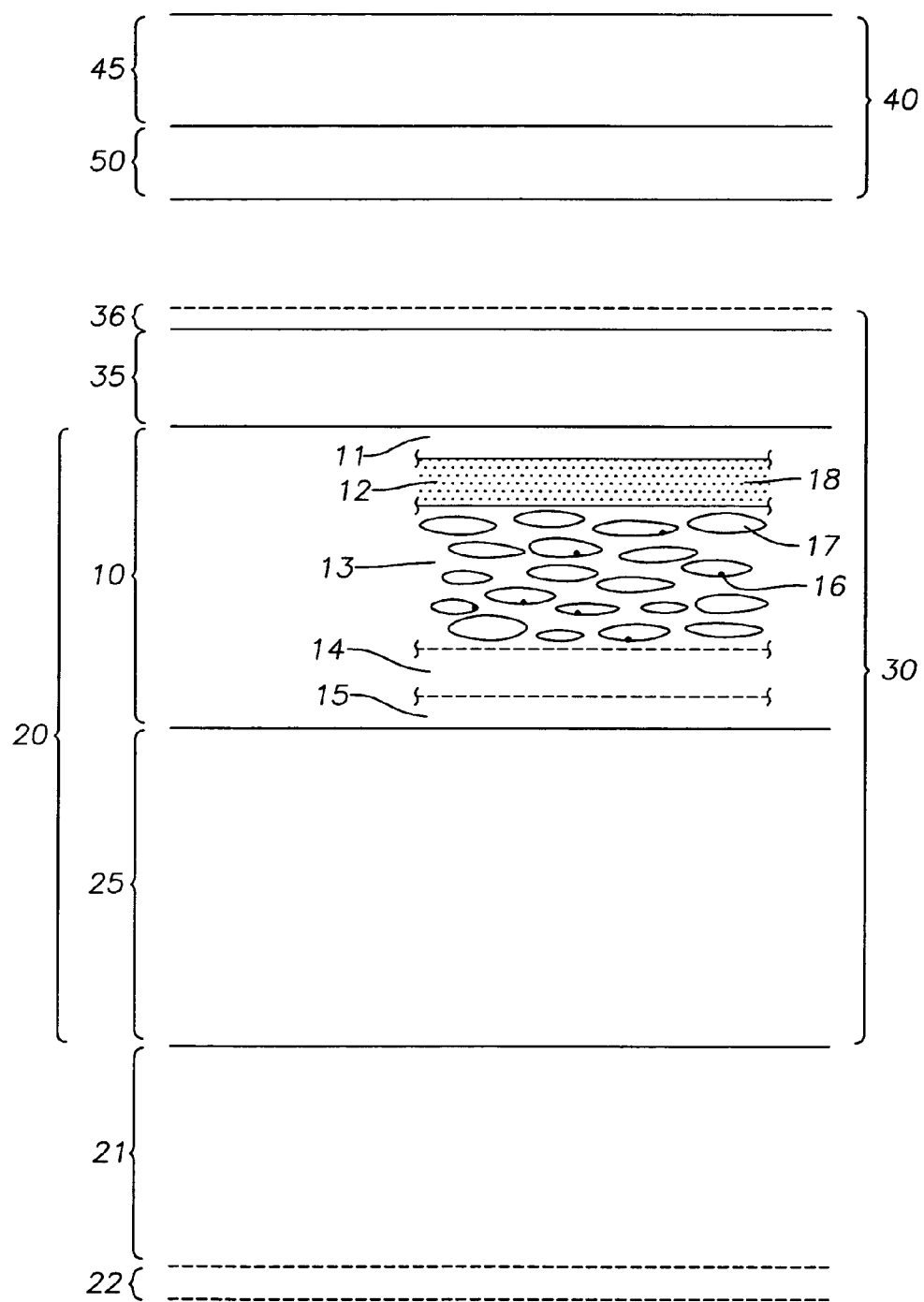
FIG. 2 provides a cross-sectional illustration of an inventive dye-diffusion thermal printing arrangement, including a dye-donor element and a dye-receiving element containing the composite film within the dye-receiving element.

FIG. 2 depicts a cross-section of a dye-diffusion thermal printing arrangement including both a dye-donor element 40 and a dye-receiving element 30. As the dye-donor element 40 is heated by the print head (not shown), dye may be selectively transferred from the dye-donor element 40 to the dye-receiving element 30, thereby forming an image or print result on a surface or within a layer of the dye-receiving element 30. The dye-donor element 40 includes at least a donor support 45 and a dye-layer 50, although it is conceivable that in some embodiments of a dye-donor element 40, the support 45 and dye layer 50 may be integrated together into a single component. The dye layer 50 generally comprises a dye that is dispersed, either selectively or homogenously, within a binder material.

The dye-receiving element 30 comprises a base 20 and a dye-image receiving layer 35 supported on one side of the base 20. The dye-image receiving layer 35 may comprise a polymer layer, such as a polycarbonate, or a coating material, an emulsion, or other media that can receive and preferably preserve dye from the dye layer 50 on a surface of the image receiving layer 35 or within the image receiving layer 35, as a dye-transfer image or other print result. In some embodiments, a primer (not shown) may be provided on a surface of the base 20 to adhere the dye-image receiving layer 35 to the base 20. In other embodiments, an overcoat such as an acrylic or lacquer may be provided on a surface of the dye-image receiving layer 35, after the image is applied to the image receiving layer 35, such that the image is between the over-lacquer 36 and the image receiving layer 35.

The base 20 comprises a base support 25, such as a cellulose fiber paper, and the composite film 10. In some embodiments, the composite film 10 may comprise a composite film such as illustrated in FIG. 1. Referring again to FIG. 2, the composite film may include a first or skin layer 11, a second or tie layer 12, and a third or core layer 13. The composite film 10 may also include optional layer 14 and/or optional layer 15. The second layer 12 also comprises a whitening agent 18 and the third layer 13 also comprises a cavitating agent 16 and is cavitated through generation of voids or cavities 17. The composite film 10 may preferably be laminated to the support 25, such as by extrusion lamination using an extrusion lamination adhesive (not shown) as the adhesive, such as a thermoplastic polymer comprising polyethylene. In addition to the base 20 and the dye-image receiving layer 35, the dye-receiving element 30 may also include a multilayer film 21 on a side of the base 20 opposite the dye-image receiving layer 35. The dye-image receiving element 30 may also comprise an anti-static layer 22, provided either as a component layer on the support 25, or on the optional film 21, or as a component within the film 21 or support 25, to dissipate static charge buildup and alleviate electrostatic adhesion between adjacent dye-receiving elements 30, within a stack or roll of dye-receiving elements 30.

As illustrated in FIG. 2, the support 25 may be provided having on a side thereof a composite film 10, opposite the dye-image receiving layer 35. For example, a dye-receiving element 30 may include the base 20, having thereon the dye image-receiving layer 35, wherein the base 20 may include a composite film 10 and a support 25, and the dye image-receiving layer 35 may be on the composite film 10 side of the base 20.

Preferred supports 25 may have the composite film 10 laminated onto a front side thereof, such that the fifth layer 15 of the composite film 10 is closest to the support 25. Particularly preferred supports 25 may have the composite film 10 extrusion-laminated onto a front side thereof. More particularly preferred supports 25 may have the composite film 10 extrusion-laminated onto the front side thereof using a resin, such as, for example, a polyolefin resin. The most preferred supports may have the composite film extrusion-laminated onto the front side thereof using a polyolefin resin and more preferably for some embodiments using a pigmented polyolefin resin. If the composite film 10 is laminated onto the support 25, it may be desirable to do so while maintaining minimal tension on the composite film 10 to minimize curl in the resulting base 20.

The composition of a support 25 having on a side thereof a composite film is not particularly limited. Example supports may contain a synthetic paper, a cellulose fiber paper, or a polymer, such as, e.g., polyester. Preferred cellulose fiber paper supports may include a water leaf sheet of wood pulp fibers or alpha pulp fibers. Example supports may be mono-layered or multilayered, including laminates.

The thickness of the support 25 is not particularly limited and may fall, for example, within any of the ranges for supports disclosed in U.S. Pat. No. 5,244,861, which is incorporated herein by reference in its entirety. A relatively thick support 25 having on a side thereof a relatively thin composite film 10 may lead to a dye-receiving element 30 having a particularly desirable photographic look and feel. A relatively thin support 25 having on a side thereof a relatively thin composite film 10 may lead to a dye-receiving element 30 that resembles plain paper, e.g., for inclusion in a printed multiple page document.

In a dye-receiving element 30, the composition of the dye image-receiving layer 35 is not particularly limited. Example dye image-receiving layers 35 may contain a polycarbonate, a polyurethane, a polyester, a poly(vinyl chloride), a poly(styrene-co-acrylonitrile), a polycaprolactone or mixtures thereof, and may be applied as a film layer or as a coating, as appropriate. The dye image-receiving layer 35 may be present on the composite film 10 side of the base 20 in any amount that is effective for the intended purpose. Preferred coating-type dye image-receiving layers 35 may have a coating weight of, for example, from 1 to 10 g/m². The dye-image receiving layer 35 may comprise a coating or emulsion on an outer surface of the composite film. In other embodiments, the dye-image receiving layer 35 may comprise a distinct, film layer adhered to the composite film 10, such as by adhesive or lamination, and may include a primer to enhance such adhesion. In other embodiments, the dye-image receiving layer 35 may comprise a surface layer or component of the composite film 10 that is coextruded with the composite film 10. In such embodiments the dye-image receiving layer may obviate the need for a separate first layer 11 and may thereby become the first layer 11 of the inventive composite film 10.

A primer layer (not shown) may be positioned between the composite film 10 and the dye image-receiving layer 35 to improve adherence of the dye image-receiving layer 35 to the composite film 10. Preferred primer layers for the dye image-receiving 35 layer may be coated onto an outer surface of a composite film 10, preferably on an outer surface of the first layer 11 of the composite film 10. The composition of the primer layer for the dye image-receiving layer 35 is not particularly limited. Preferred primer layers for the dye image-receiving layer may contain an amino-functional organo-oxysilane in a solvent mixture, such as, for example, an ethanol-methanol-water solvent mixture. Other preferred primer layers for the dye image-receiving layer may contain a gelatin and titanium dioxide.

There may be an overcoat 36 on a side of the dye image-receiving layer 35 opposite the composite film 10. The composition of the overcoat 36 is not particularly limited. A preferred overcoat may contain for example, a solvent mixture, such as a mixture of methylene chloride and trichloroethylene; and a polymer, such as, for example, a polycarbonate random terpolymer of bisphenol-A, diethylene glycol, and a polydialkylsiloxane, such as a polydimethylsiloxane.

In some embodiments, a film 21 may be provided on a back side of the support 25, i.e., on a side of the support 25 opposite the composite film 10. The back side film 21 may be mono-layered or multilayered and may preferably be a polyolefin film. The particular amount of layers and the composition of each layer of the back side film are not limited. Preferred classes of materials from which one or more components for the layer(s) of the back side film may be independently chosen include polyesters, polyolefins, especially polyethylene, such as high density polyethylene, polypropylene, polymethylpentene films, and mixtures thereof. Other examples may include polyolefin copolymers, such as, for example, copolymers of ethylene and propylene. Polypropylene may be preferred. The back side film 21 may be a composite film, similar to or the same as the composite film 10 provided on the front side of the support 25. An example of a commercially available back side film is BICOR 70MLT, a treated, one-side matte finish, one-side treated polypropylene film (18 μm thick; d=0.9 g/cm³) including a solid oriented polypropylene core, available from ExxonMobil Chemical (Houston, Tex.). The thickness of the back side film 21 is not particularly limited. Preferred back side films 21 may be from 15 to 30 μm thick.

Supports 25 may have a back side film 21 provided thereon using a tie layer, such as, for example, a polyolefin, especially a polyethylene or a polypropylene. Preferred supports 25 also may have the back side film 21 laminated thereon. Particularly preferred supports 25 may have the back side film 21 extrusion-laminated thereon. More particularly preferred supports may have the back side film extrusion-laminated thereon using a resin, such as, for example, a polyolefin resin, especially a high density polyethylene. In still other embodiments, the supports 25 may have a back side film 21 provided thereon using an adhesive to bond the support to the back side film 21.

The back side film 21, when present, may contain a primer layer provided on a side thereof opposite the support 25. Preferred primer layers may be coated onto the back side film 21. The composition of the primer layer which may be provided on the back side film is not particularly limited. Preferred primer layers which may be provided on the back side film may contain: a polyolefin, such as, for example, a copolymer or terpolymer of polypropylene, e.g., an ethylene-propylene copolymer or an ethylene-propylene-butylene terpolymer; a homopolymer and/or a copolymer of an acrylic monomer, such as, for example, an acrylic acid, a methacrylic acid and/or any of their esters; or mixtures thereof. Copolymers of acrylic monomers may contain a small amount of a vinyl monomer, such as, for example, a styrene.

The primer layer which may be provided on the back side 21 film may contain additives and/or fillers, such as, for example, titanium dioxide, calcium carbonate, clay, etc. A coated primer layer may be applied at a coverage which is not particularly limited. Preferred coated primer layers may be applied at coverage of from, for example, 0.1 g/m² to 2.0 g/m².

An antistatic layer 22 may be provided on the back side film 21 or on the primer layer (not shown) or on the back side of the support 25. The composition of the antistatic layer 22 is not particularly limited. A preferred antistatic layer 22 may contain a polymeric binder, submicron colloidal inorganic particles and an ionic antistatic agent.

Examples of a polymeric binder which may be employed in an antistatic layer may include poly(ethylene oxide), poly (ethylene glycol), poly(vinyl alcohol) (PVA), etc. Examples of submicron, colloidal inorganic particles which may be employed in the antistatic layer may include silica, alumina, titanium dioxide, barium sulfate, etc. Examples of ionic antistatic agents which may be employed in the antistatic layer may include alkali metal salts or vanadium pentoxide. Preferred antistatic layers may contain an alkali metal salt as the ionic antistatic agent, especially a potassium acetate, a sodium acetate, a potassium chloride, a sodium chloride, a potassium nitrate, a sodium nitrate, a lithium nitrate, a potassium formate, or a sodium formate.

A dye-donor element 40 may be used in conjunction with the dye-receiving element 30 to produce the desired graphic, image, or text (collectively, an "image") on the dye-receiving element 30. The dye-donor element 40 may include a donor support 45 having thereon a dye-containing layer 50. Any suitable dye may be used in the dye-donor element 40. Preferred dyes may be transferable to the dye image-receiving layer of the dye-receiving element by the action of heat. The process of heating the dye-donor element or the dye layer of the dye-donor element may be referred to as image-wise heating the dye-donor element. Heating means to warm or raise the temperature of the dye-donor element sufficient to cause displacement of at least some dye from the dye-donor element. Dye-donor elements 40 may be used to form a dye transfer image (not shown) on the dye-receiving layer 35 of the dye-receiving element 30. A process of forming a dye transfer image may include imagewise-heating a dye-donor element 40 and transferring a dye image to a dye-receiving element 30 to form a dye transfer image. Though dye-transfer may be a suitable use for applying images to a dye receiving element 30, other methods such as but not limited to laser printing, electrostatic printing, paint-jet printing, or silver-halide development may also be used to provide images on a dye-receiving element 30.

A preferred dye-donor element 40 may include, for example, a polyester donor support 45 coated with, for example, sequential repeating areas of cyan, magenta and yellow dye. A particularly preferred support 45 for the dye-donor element 40 may contain a poly(ethylene terephthalate). The dye transfer steps may be sequentially performed for each color to obtain a three-color dye transfer image. Alternatively, the process may be performed for only a single color, and a monochrome dye transfer image may be obtained.

A thermal printing head (not shown) may be used to impart heat to the dye-donor element 40 to cause a transfer dye from a dye-donor element 40 to a receiving element 30. The particular type of thermal printing head is not limited. Commercially available examples of thermal printing heads include a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used. For example, there may be used a laser, as described in, e.g., GB No. 2,083,726A.

Thus, a thermal dye transfer assemblage generally may include (a) a dye-donor element 40, and (b) a dye-receiving element 30. The dye-receiving element 30 may be in a superposed relationship with the dye-donor element 40 so that the dye layer 50 of the donor element 40 is in contact or near-contact with (broadly meaning either directly touching or separated by a small gap) the dye image-receiving layer 35 of the receiving element 30.

When, for example, a three-color image is desired, the assemblage may be formed on three occasions during the time when heat is applied by the thermal printing head. After a first dye is transferred, the elements may be peeled apart. A second dye-donor element (or another area of the donor element with a different dye area) may then be brought in register with the dye-receiving element, and the process may be repeated. The third color may be obtained in the same manner. Other embodiments may use more colors than the three colors used in a three-color image, such as four or more colors and there may be an overlacquer.

The composite films such as illustrated in FIG. 1, may also be included as part of a label structure that may be suitable for use as a label or tag-label. Example label structures include, but are not limited to, a label structure including a dye image-receiving layer 35, the composite film 10, and an adhesive layer (not shown). Other label embodiments may comprise a dye image-receiving layer 35, the composite film 10, the support 25, an adhesive layer (not shown), and optionally a release liner (not shown). Preferred label structures may have the fifth layer of a five-layer composite film closest to the adhesive layer or support as compared to the first layer of the composite film. The label structure may be formed by any method, including coextrusion and/or lamination, and may include other layers, such as, e.g., a label liner or back side film, which may be used on a side of the adhesive layer opposite the composite film or support. Indeed, the label structure may include any of the other layers mentioned herein.

The composition of the dye image-receiving layer of the label structure is not particularly limited and may include, for example, any of the components mentioned herein with respect to the dye image-receiving layer of the dye-receiving element. The composition of the support of the label structure is not particularly limited and may include, e.g., any of the components mentioned herein with respect to the support of the dye-receiving element. The composition of the adhesive layer of the label structure is not particularly limited. For example, the adhesive layer may be a pressure-sensitive adhesive, e.g., for example, permanent, peelable, and repositionable pressure-sensitive release types, a cold glue adhesive, or a hot melt adhesive. As another example, any of the adhesives disclosed in U.S. Pat. No. 6,436,604 ("US '604"), which is incorporated herein by reference in its entirety, may be included in the adhesive layer of the label structure. Furthermore, multiple adhesive layers may be used in the label structure, as also disclosed in US '604.

The composition of the liner, if any, of the label structure is not particularly limited. For example, the liner may be paper-based or plastic-based, or any of the liners disclosed in US '604. The liner may allow the label to be supported on a roll or sheet, or transported through a printing process and/or converting process, while protecting the adhesive layer.

The label structures may be printed or otherwise have an image provided thereon by any method, including the process of forming a dye transfer image described earlier herein. Thereafter, the labels may be applied to packages for any reason, including providing brand awareness, to show the contents of the packages, to convey a message regarding the contents of the packages, and/or to supply consumer information, such as, e.g., directions on product use or an ingredient listing of the contents. The image on the label structures may be protected by, for example, an over laminate material or a protective coating. Such coating may provide mar-resistance to the image.

The following specific examples further illustrate the invention.

EXAMPLE 1 (COMPARATIVE)

A three-layer composite film was prepared having the following structure and composition:

| Layer | Resin | Wt % | Trade name | Thickness (mils) Poly Gauge | Optical gauge |
|---|---|---|---|---|---|
| 1 | polypropylene | 64 | Exxon PP4612 | 0.125 | 0.125 |
|   | TiO$_2$/EP copolymer masterbatch | 36 | Ampacet's 60 wt % TiO$_2$ masterbatch | | |
| 2 | Polypropylene | 90 | Exxon PP4612 | 0.58 | 1.15 (cavitated) |
|   | PBT | 10 | Celanese 1300 A | | |
| 3 | polypropylene | 92 | Exxon PP4612 | 0.125 | 0.125 |
|   | TiO$_2$/EP copolymer masterbatch | 8 | Ampacet's 60 wt % TiO$_2$ masterbatch | | |
|   | Total thickness | | | 0.83 | 1.40 |

The outer surface of the third layer was corona treated. The composite film was produced at a yield of 35,000 in$^2$/lb (49.8 m$^2$/kg), it had an overall density of 0.57 g/cm$^3$, and the density of the second layer (in this case, the core layer) was 0.47 g/cm$^3$. The composite film also had a whiteness of 82 and a 45° gloss of 42 gloss units, as measured for the outer surface of the first layer. Whiteness may be measured using a Minolta CM508-C reflectance spectraphotometer.

EXAMPLE 2

A five-layer composite film, according to the present invention, was prepared having the following structure and composition:

| Layer | Resin | Wt % | Trade name | Thickness (mils) Poly gauge | Thickness (mils) Optical gauge |
|---|---|---|---|---|---|
| 1 | EPB terpolymer | 100 | JPC XPM7510 | 0.03 | 0.03 |
| 2 | polypropylene | 56.8 | Total EOD 04-28 | | |
| | TiO$_2$/PP masterbatch | 43.2 | Ampacet's 50 wt % TiO$_2$ | 0.125 | 0.125 |
| 3 | polypropylene | 90 | Total EOD 04-28 | | |
| | PBT | 10 | G.E. Valox 295 | 0.52 | 1.09 (cavitated) |
| 4 | polypropylene | 90.4 | Total EOD 04-28 | | |
| | TiO$_2$/PP masterbatch | 9.6 | Ampacet's 50 wt % TiO$_2$ | 0.125 | 0.125 |
| 5 | EPB terpolymer | 100 | JPC XPM7510 | 0.03 | 0.03 |
| | Total Thickness | | | 0.83 | 1.40 |

The outer surface of the fifth layer was corona treated. The composite film was produced at a yield of 35,000 in$^2$/lb (49.8 m$^2$/kg), with an overall density of 0.57 g/cm$^3$. The density of the third layer (in this case, the core layer) was 0.45 g/cm$^3$. The composite film also had a whiteness of 87 and a 45° gloss of 47 gloss units as measured for the outer surface of the first layer.

This example illustrates that a film according to this invention may provide improved gloss and whiteness, or at least not likely result in a reduction of either gloss or whiteness, as compared to a film not having a skin layer. Also, the inventive film includes protective skin layers, while retaining the same overall thickness and yield as compared to prior art films.

While the invention has been described in detail and with reference to specific embodiments and examples, it will be apparent to one of ordinary skill in the art that various changes and modifications can be made therein without departing from the spirit of the invention. The examples recited herein are demonstrative only and are not meant to be limiting. Further embodiments are included within the following claims.

What is claimed:

1. A composite film useful as an image-support film, comprising:
    a first layer including a thermoplastic polymer;
    a second layer comprising a thermoplastic polymer and at least about 25 wt % of a whitening agent, based upon the total weight of the second layer;
    a third layer comprising a thermoplastic polymer and a cavitating agent, wherein the third layer is a cavitated layer; and
    a fourth layer comprising a thermoplastic polymer and a whitening agent,
    wherein the second layer is between the first layer and the third layer, and the fourth layer is on a side of the third layer opposite from the second layer.

2. The composite film of claim 1, further comprising a fifth layer on a side of the fourth layer opposite the third layer, wherein the fifth layer comprises a thermoplastic polymer.

3. The composite film of claim 2, wherein the fifth layer optionally further comprises a whitening agent, and the amount of the whitening agent in the fourth layer is greater than the amount of the whitening agent in the fifth layer.

4. The composite film of claim 3, wherein the fifth layer further comprises a whitening agent and the amount of the whitening agent in the fourth layer is more than 10 times greater than the amount of the whitening agent in the fifth layer.

5. The composite film of claim 2, wherein the fifth layer is free of any whitening agent.

6. The composite film of claim 1, wherein the fourth layer comprises a whitening agent in an amount of up to 35 wt %, based on the total weight of the fourth layer.

7. The composite film of claim 1, wherein the fourth layer comprises a whitening agent and the amount of the whitening agent in the second layer is greater than the amount of the whitening agent in the fourth layer.

8. The composite film of claim 1, wherein the third layer has a density of from 0.35 to 0.55 g/cm$^3$.

9. The composite film of claim 1, wherein the third layer has a void percentage of from 40 to 60%, based upon the bulk volume of the third layer.

10. The composite film of claim 1, wherein an outer surface of the first layer has a 45-degree gloss of from 5 to 70%, as measured according to ASTM D 2457.

11. The composite film of claim 1, wherein at least one of the second layer and the fourth layer has a thickness of from 1.25 to 7.75 μm.

12. The composite film of claim 11, wherein each of the second layer and the fourth layer independently has a thickness of from 1.25 to 7.75 μm.

13. The composite film of claim 1, wherein the thermoplastic polymer of the third layer comprises a polypropylene.

14. The composite film of claim 1, wherein the whitening agent of the second layer comprises titanium dioxide.

15. The composite film of claim 1, wherein the cavitating agent of the third layer comprises at least one of polybutylene terephthalate and calcium carbonate.

16. The composite film of claim 1, wherein the first layer comprises from about 0.02 wt % to about 0.20 wt % of a whitening agent, based upon the total weight of the first layer.

17. The composite film of claim 1, wherein the second layer comprises at least about 30 wt % of whitening agent, based upon the total weight of the second layer.

18. The composite film of claim 1, wherein the second layer comprises at least about 40 wt % of whitening agent, based upon the total weight of the second layer.

19. The composite film of claim 1, wherein the first layer is free of any whitening agent.

20. The composite film of claim 1, wherein the polymer of the second layer consists of polypropylene.

21. The composite film of claim 1, wherein the second layer may include at least 10 times the amount of whitening agent as in the first layer, based upon the total weight of the second layer.

22. A dye-receiving element, comprising:
    a base and a dye-image receiving layer, the base comprising:
    a composite film and a support, wherein the dye-image receiving layer is on the composite film side of the base, and the composite film comprises:

a first layer comprising a thermoplastic polymer and from about 0.02 wt % to about 0.20 wt % of a whitening agent, based upon the total weight of the first layer;

a second layer comprising a thermoplastic polymer and at least about 25 wt % of a whitening agent, based upon the total weight of the second layer; and a third layer comprising a thermoplastic polymer and a cavitating agent, wherein the third layer is a cavitated layer;

wherein the second layer is between the first layer and the third layer;

further comprising a fourth layer on a side of the third layer opposite from the second layer, wherein the fourth layer comprises a thermoplastic polymer.

23. The composite film of claim 22, further comprising a fifth layer on a side of the fourth layer opposite the third layer, wherein the fifth layer comprises a thermoplastic polymer.

24. A dye-receiving element, comprising:

a base and a dye image-receiving layer, the base comprising:

a composite film and a support, wherein the dye image-receiving layer is on the composite film side of the base, and the composite film comprises:

a first layer comprising a thermoplastic polymer;

a second layer comprising a thermoplastic polymer and at least about 25 wt % of a whitening agent, based upon the total weight of the second layer; and a third layer comprising a thermoplastic polymer and a cavitating agent, wherein the third layer is a cavitated layer;

wherein the second layer is between the first layer and the third layer; and wherein the first layer is free of any whitening agent;

further comprising: a fourth layer on a side of the third layer opposite from the second layer, wherein the fourth layer comprises a thermoplastic polymer.

25. The dye-receiving element film of claim 24, further comprising:

a fifth layer on a side of the fourth layer opposite the third layer, wherein the fifth layer comprises a thermoplastic polymer.

26. The dye-receiving element of claim 25, wherein the fifth layer is free of any whitening agent.

27. A label structure, comprising a composite film and an adhesive layer, wherein the composite film comprises:

a first layer comprising a thermoplastic polymer;

a second layer comprising a thermoplastic polymer and at least about 25 wt % of a whitening agent, based upon the total weight of the second layer;

a third layer comprising a thermoplastic polymer and a cavitating agent, wherein the third layer is a cavitated layer;

a fourth layer comprising a thermoplastic polymer; and a fifth layer comprising a thermoplastic polymer, wherein the second layer is between the first layer and the third layer, the third layer is between the second layer and the fourth layer, and the fourth layer is between the third layer and the fifth layer, and wherein the first layer is free of any whitening agent.

28. The label structure of claim 27, wherein the adhesive layer comprises a pressure-sensitive adhesive.

29. The label structure of claim 27, wherein the adhesive layer comprises a cold glue adhesive.

30. The label structure of claim 27, wherein the adhesive layer comprises a hot melt adhesive.

31. The label structure of claim 27, further comprising:

a dye image-receiving layer, such that the label structure comprises the dye image-receiving layer, the composite film, and the adhesive layer.

32. The label structure of claim 27, further comprising a liner on a side of the adhesive layer opposite the composite film.

33. The label structure of claim 27, further comprising a fourth layer on a side of the third layer opposite the second layer.

34. The label structure of claim 27, wherein the fourth layer further comprises at least 15 wt % whitening agent.

35. The composite film of claim 27, wherein the second layer may include at least 10 times the amount of whitening agent as in the first layer, based upon the total weight of the second layer.

* * * * *